March 23, 1937. C. H. HUGHES 2,074,472
MECHANICAL GENERATOR FOR WATER GAS MACHINES
Filed Dec. 22, 1931 3 Sheets-Sheet 1
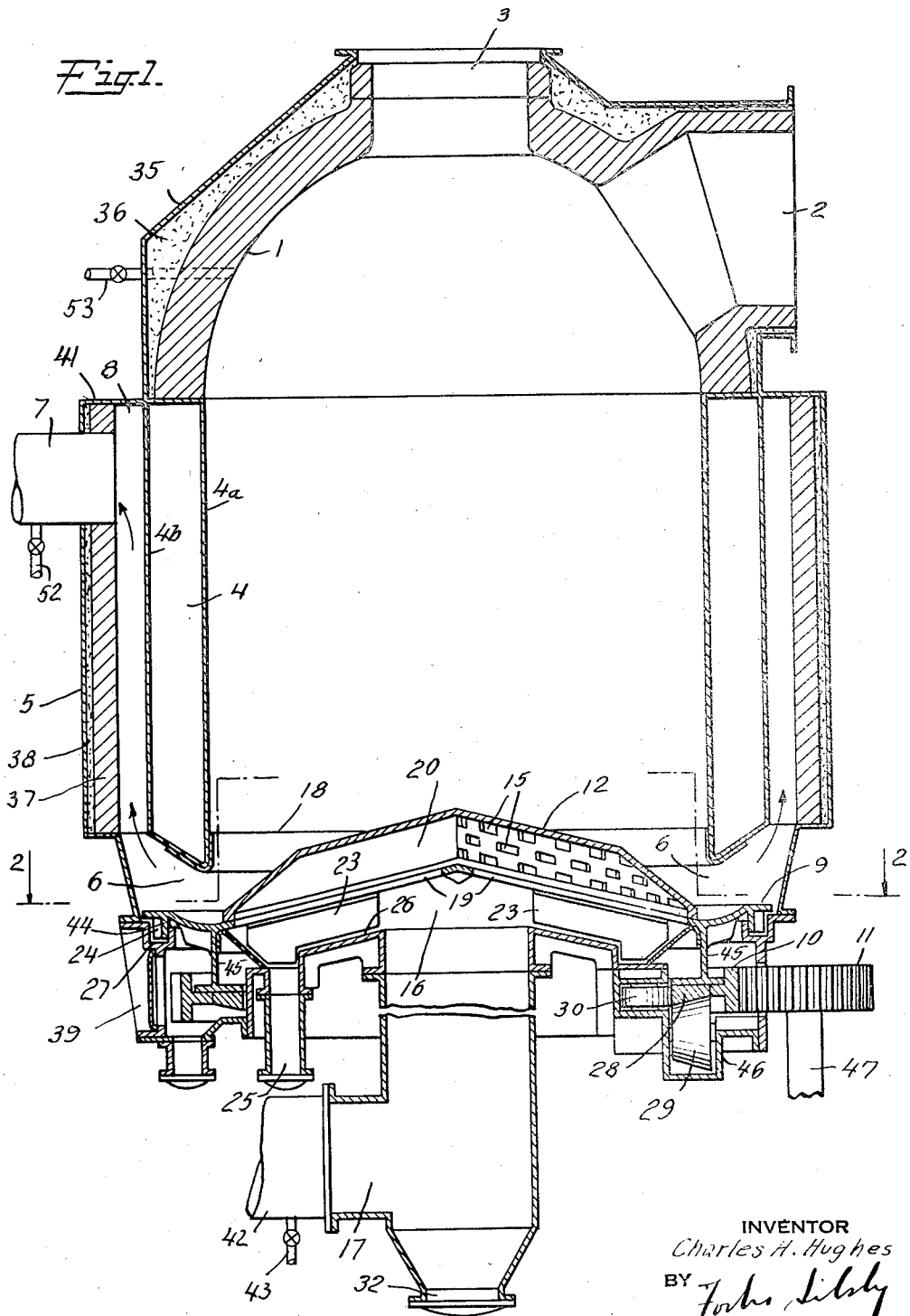
INVENTOR
Charles H. Hughes
BY
ATTORNEY March 23, 1937.  C. H. HUGHES  2,074,472
MECHANICAL GENERATOR FOR WATER GAS MACHINES
Filed Dec. 22, 1931  3 Sheets-Sheet 2
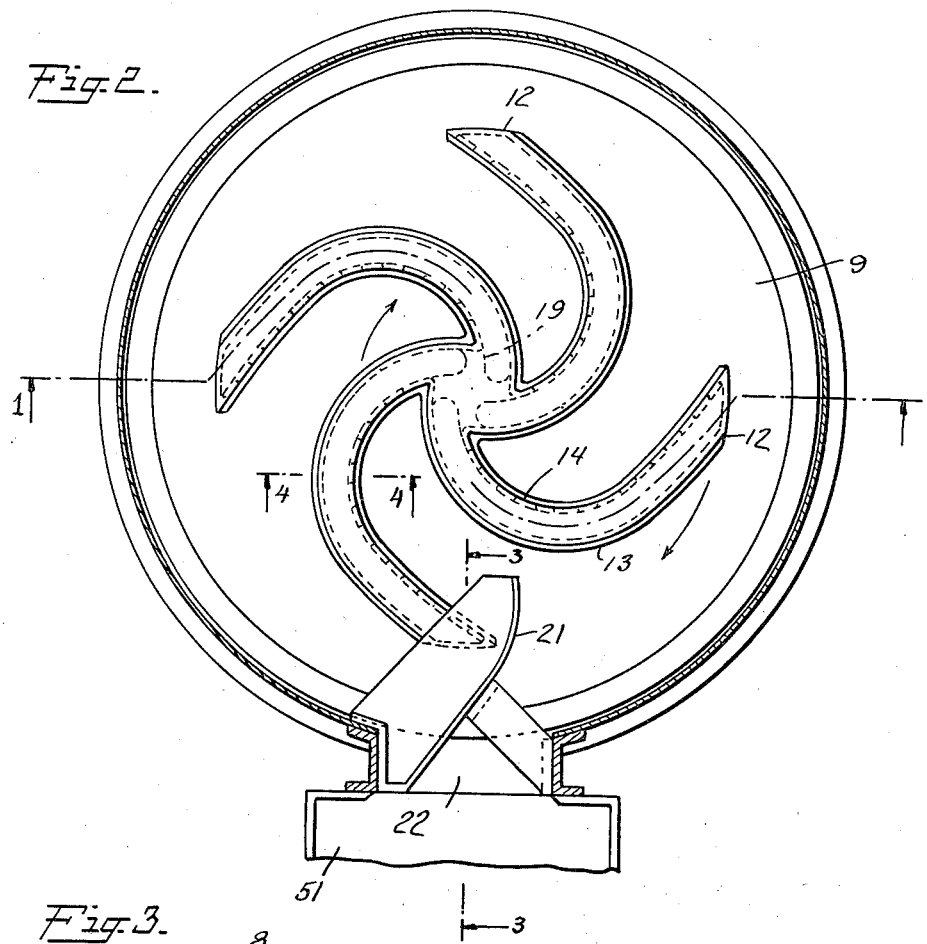
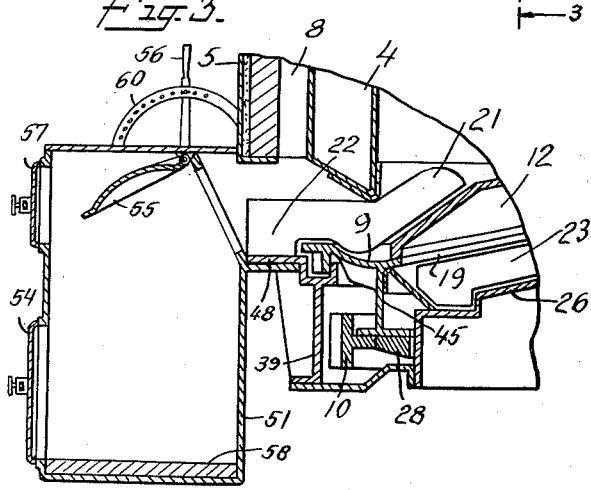
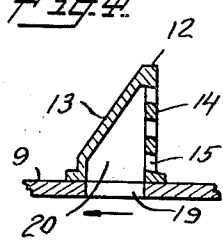
INVENTOR
Charles H. Hughes
BY
ATTORNEY March 23, 1937.  C. H. HUGHES  2,074,472
MECHANICAL GENERATOR FOR WATER GAS MACHINES
Filed Dec. 22, 1931  3 Sheets-Sheet 3
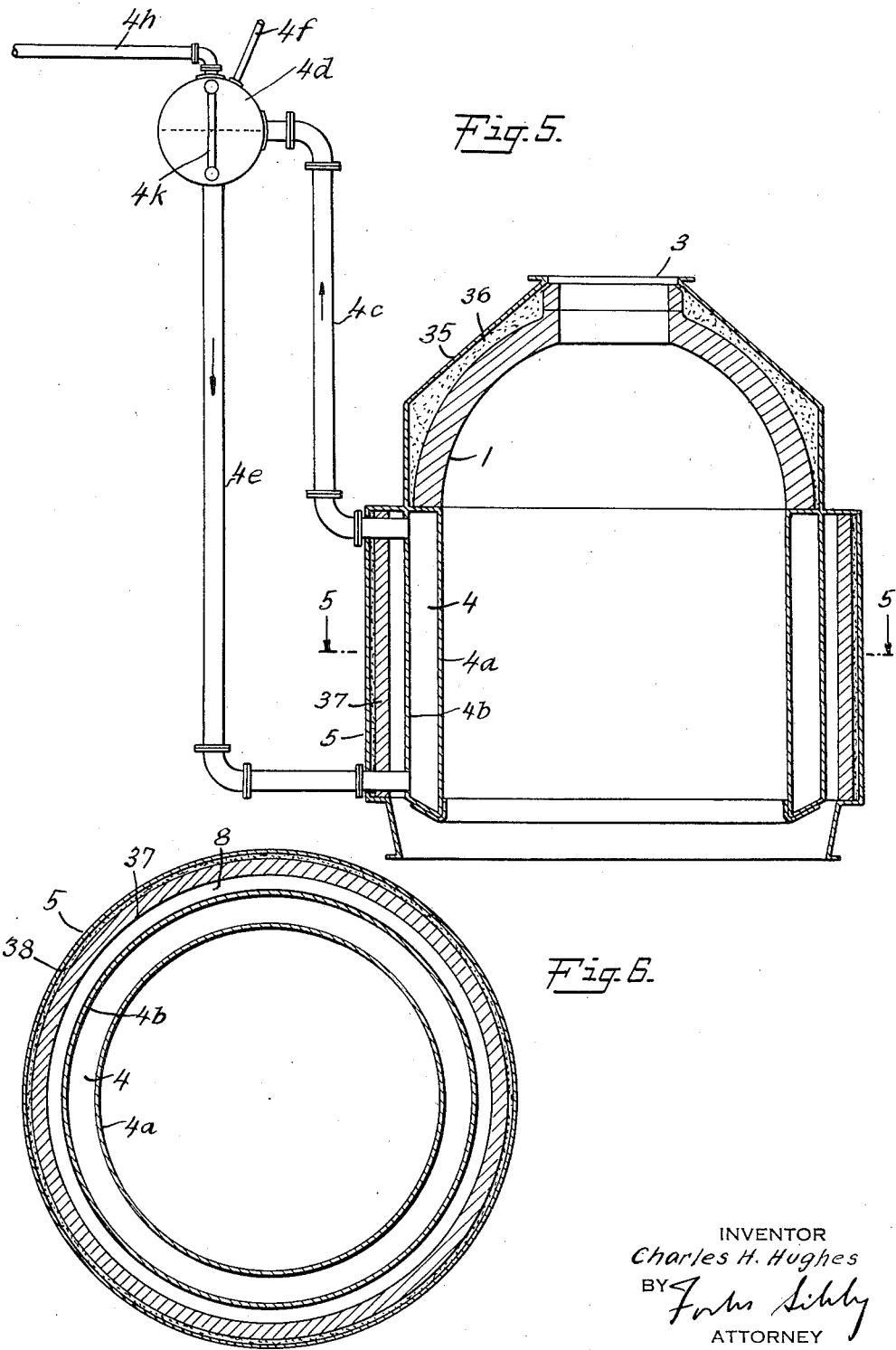

Patented Mar. 23, 1937

2,074,472

UNITED STATES PATENT OFFICE 2,074,472

MECHANICAL GENERATOR FOR WATER GAS MACHINES

Charles H. Hughes, Glen Ridge, N. J., assignor to Semet-Solvay Engineering Corporation, New York, N. Y., a corporation of New York Application December 22, 1931, Serial No. 582,555

6 Claims. (Cl. 48—68)

This invention relates to the production of combustible gases, such as producer gas and water gas, and is especially concerned with a self clinkering water gas generator. More particularly, the invention is directed to the construction of a generator embodying a rotary grate or fuel supporting surface which is simple in construction and is efficient and economical in operation. The invention further contemplates the embodiment of such a fuel supporting surface in a water gas generator especially adapted for producing water gas in accordance with the "backrun" process of making gas disclosed and claimed in Young Patent No. 1,468,190 of September 18, 1923, the water gas generator being provided with a water jacket or boiler shell with which the "backrun" gases contact during the withdrawal thereof from the generator and thus give up a portion of their sensible heat before finally leaving the generator.

In the production of commercial gases, such as water gas and producer gas, by present processes various types of generators and producers have been employed. Producers involving a rotary ash pan or grate upon which the fuel bed is supported have been used for the manufacture of producer gas. In some cases a distributing member has been provided centrally above the ash pan for the admission of air and steam to the fuel bed thereabove. Such constructions have also been proposed for the manufacture of water gas. Operating with a central distributor, however, it has been found, causes channeling of the fuel bed due to the continued admission of air and steam at the same points beneath the fuel bed. Channeling, in the manufacture of water gas, detrimentally affects the efficiency of the generator; results in the production of a gas of lower calorific value; and reduces the gas making capacity of the plant.

It is an object of my invention to provide a self clinkering generator equipped with a rotary grate, designed to uniformly distribute air and steam throughout the fuel bed during the blasting and uprun water gas making cycles, respectively, and at the same time agitate the fuel bed, crush and grind clinker therein, and effect the discharge of ash and clinker therefrom.

It is a further object of this invention to provide a generator which is especially adapted for the practice of the "backrun" process of making water gas of the aforementioned Young patent, the generator being designed to efficiently extract sensible heat from "backrun" gases before they finally leave the generator.

Further objects will become apparent from the following description taken with the accompanying drawings.

The preferred embodiment of gas generator of my invention involves a rotary ash pan upon which there are fixed hollow impelling arms or plows having apertures therein. These apertures, by means of openings in the ash pan directly beneath the impelling arms, communicate with what might be considered an open chamber or manifold beneath the ash pan through which air and steam is passed into and through the apertures in the plows into the fuel bed. The ash pan and plows constitute the grate for supporting the fuel bed. Passage of air and steam through the hollow plows or arms cools these arms and the connected grate structure and effectively protects the grate against the high temperature prevailing in the base of the generator. Further, due to the rotation of the plows with the ash pan and due to the peculiar "star fish" shaped arrangement of the plows, the fuel bed is continuously agitated and air and steam efficiently distributed therethrough.

The fuel chamber above the ash pan is surrounded by a metal water jacket terminating short of the ash pan and forming a passageway through which the downrun gases pass into an annular channel positioned exteriorly of the water jacket. The annular channel is preferably substantially coextensive with the water jacket, thus providing for extensive contact between the water jacket and the gases passing through the channel.

In order that my invention may be more clearly understood, there is shown in the accompanying drawings embodiments thereof, but it is to be understood that these embodiments are for the purpose of illustration only and that the invention is not intended to be limited to the particular constructions which have been made the subject of illustration.

In the drawings:

Fig. 1 is a vertical section through a water gas generator embodying my invention, taken in a vertical plane passing through the line 1—1 of Fig. 2;

Fig. 2 is a fragmentary horizontal section taken in a plane passing through line 2—2 of Fig. 1;

Fig. 3 is a fragmentary vertical section taken in a plane passing through line 3—3 of Fig. 2 showing the relation of the ash removing plow to the rotating ash pan and impelling arms;

Fig. 4 is a fragmentary enlarged section taken in a plane passing through line 4—4 of Fig. 2, showing the construction of the ash plows;

Fig. 5 is a vertical section, partly in elevation, of the portion of the generator above the ash pan, showing a steam drum and the connections therefrom to the water jacket of the generator; and Fig. 6 is a horizontal section taken in a plane passing through line 5—5 of Fig. 5.

Referring to the drawings, numeral 1 indicates the wall of the upper section of the generator which is constructed of refractory material. The top of the generator is provided with the customary charging hole 3 and gas offtake 2 arranged to communicate with a carburetor which in turn may be connected to a superheater (not shown). The outer wall of the generator is constituted of usual boiler metal 35, insulating material 36 being disposed between metal wall 35 and refractory lining 1 at the top of the generator. A metal water jacket or annular boiler 4 is positioned with its top abutting against the wall 1. Inner boiler wall 4a is disposed to constitute a continuous extension of the base of refractory lining 1. The inner wall 4a of boiler 4 constitutes the inner wall of the fuel chamber of the generator. Outer wall 4b may be made integral with the metal wall 35 of the generator. These walls 4a and 4b extend down to a point spaced above ash pan 9, as shown in Fig. 1. Upcomer tube 4c leads from the top of water jacket 4 to a steam and water drum 4d, provided with downcomer water tube 4e, leading into the base portion of the water jacket. The steam drum 4d is also equipped with a water supply pipe 4f, a steam offtake pipe 4h, and a gauge glass 4k.

Surrounding the boiler 4 and spaced from its exterior wall 4b, so as to provide an annular passage 8 (see Fig. 6), is metal wall 5 which is preferably lined with heat resistant refractory material 37 between which and the metal wall 5 suitable heat insulating material 38 is placed. Wall 5 is welded or otherwise secured to a ring member 39, which is in turn suitably secured to channel bars (not shown) on which the gas generator rests. Wall 5 has an annular flange 41 at the top thereof which may be integral with the wall. This flange is welded or otherwise secured to exterior wall 4b of the water jacket, preferably in the same plane with the top of the water jacket. Flange 41, it will be noted, functions as a closure for the top of annular passage 8.

At the bottom of the generator, an ash pan 9 is provided. This ash pan extends outwardly beyond the walls of the water jacket 4 into close proximity to wall 5 of the generator. The top of ash pan 9 is spaced beneath the base of water jacket 4 to define passageways 6 through which gases may pass from the fuel chamber to and through the annular passage 8 between wall 5 and the boiler wall 4b. A downrun outlet or gas offtake 7 is provided in wall 5 for the removal of gases from the annular space 8 during the back or downrun period of making gas. Thus it will be seen that gases passing downwardly through the generator, through passageway 6, and up through the annular channel 8, must contact with substantially the entire surface of the boiler 4. Due to the fact that the boiler extends substantially the full length of the fuel chamber, a relatively long contact is provided between outgoing gases and the boiler surface.

The ash pan 9 comprises a rotatable conical plate having rigidly affixed thereto a convenient number of impelling arms or plows 12, the ash pan and arms constituting a grate. These arms are preferably so shaped that during rotation of the ash pan they tend to force loose material away from the center of the ash pan toward the periphery of the pan. As shown in Fig. 4, the impelling arms have their leading edges 13 inclined downwardly with respect to the top of the ash pan in the direction of rotation of the pan so that the arms exert a plowing or wedging action. Trailing edges 14 of the plows are preferably vertical or at right angles to the ash pan. The arms 12 may be made integral with plate 9 or may be bolted or otherwise attached to its upper surface so that they rotate therewith.

In the embodiment of the invention shown in Fig. 2, four plows are employed extending radially from substantially the central point of the ash pan, each plow being substantially triangular in section as shown in Fig. 4. Rotation of the ash pan with the plows thereon exerts a centrifugal component of force upon the ash and clinker thereon, forcing the same from the interior of the fuel bed to the exterior thereof. Directly beneath the impelling arms 12, the ash pan is provided with openings 19. The plows 12 are hollow, as indicated by reference numeral 20, openings 19 in the ash pan registering with the cavity thus formed in the base of the plows. The trailing edges 14 of each of the arms have therein a series of apertures 15.

The ash pan and plows constitute the support for the fuel bed in the fuel chamber of the generator; in other words, the ash pan and plows function as the grate of the generator, the top of the grate extending above the base of the water jacket 4. In operation, the leading edge of the plows agitates and opens up the fuel bed for the introduction of air and steam through the trailing edges. Clogging of the apertures in the plows is prevented since the sides of the plows having the apertures are not forced to enter the fuel bed.

An open chamber or manifold 16 is provided beneath the ash pan. Conduit 17 is centrally disposed with respect to the chamber 16 and functions for the admission of air and steam into this chamber. Air is admitted through air blast pipe 42 and steam through pipe 43, both leading into conduit 17. This conduit may be provided with a trap 32 for removing loose material, such as ashes, which may find its way through the grate into this conduit. The ash pan defines the top of the chamber 16 so that air and steam introduced into the chamber pass up through openings 19 into the cavities 20 and therefrom through apertures 15 into the fuel bed. In this manner, during the rotation of the ash pan, the air and steam are uniformly distributed along the bottom of the fuel bed while the fuel bed is continuously agitated and opened up by the plows. The air and steam blasts being directed toward the ash pan surface, assist in keeping this surface cool and at the same time tend to remove ashes therefrom.

Ash pan 9 is provided on its under face with flanges 23 which serve as cooling flanges and reinforcing members. These flanges are, furthermore, so designed that they act as scrapers along the inclined plates 26, defining base portions of gas chamber 16. Any ash or other material which finds its way through the grate onto the plates 26 is scraped by flanges 23 into trap 25. Trap 25 may be equipped with a quick opening door for the ready removal of material therefrom. Additional scrapers 24, preferably formed on the base of ash pan 9 and arranged to rotate in channel 27, in which rib or flange 44 of the ash pan rides, function to remove ashes and other material in the channel 27 and effect the discharge thereof into a trap (not shown) similar to trap 25. Rib 44 of the ash pan is in frictional contact with a machined side wall of the channel 27, making a reasonably gas tight joint which seals the outer circumferential portion of the ash pan against the passage of gas thereabout.

Beneath the ash pan and welded or otherwise secured to flange 45 is provided an annular track 28. This track is adapted to ride on a convenient number of supporting rollers 29 rotatably mounted in a closed frame 46 in turn carried by the channel bars or other base for the generator. Also secured to flange 45, as by welding or bolting, is an annular gear ring 10. Gear 10 meshes with a pinion 11 keyed to a shaft 47. This shaft may be driven by an electric motor (not shown) or from any other suitable source of power. A roller bearing 30 or other suitable bearing is preferably mounted in the base frame 46 in frictional contact with an inner edge of ring 28 and prevents lateral displacement of the gear 10 by the driving pinion. It will, of course, be understood that any suitable type of driving mechanism for rotating the ash pan may be utilized in lieu of the rotating mechanism herein described.

Suitably mounted on flange 48 of ring member 39 of the generator, just above the ash pan 9, is a combined ash removing plow and clinker breaker 21. The base of the water jacket 4 is preferably armored with heavy metal plate 18, which cooperates with plows 12 to crush and grind clinker therebetween. Plate 18 also functions to protect the base of the water jacket. Preferably, plow 21 is of a length such that it extends across the unobstructed peripheral portion of ash pan 9 and is formed with a crusher or cutter extension which protrudes beyond the extremities of arms 12 as shown in Figs. 2 and 3. Hence, during the rotation of the ash pan, the extremities of the impeller arms 12, pass under plow 21 and cooperate therewith to crush and grind the clinker. Plow 21 also acts to remove from the periphery of the ash pan ash and clinker through the discharge port 22 from which the ashes drop into an ash hopper 51. Further, if desired, a series of clinker crusher arms similar to plow 21 may be fixed to the generator walls for cooperation with the plows 12 to crush and grind the clinker.

The ash hopper 51 is provided with a door 54 through which ashes and clinker may be removed from time to time as they accumulate therein. The ash discharge port 22 of the generator is provided with a door 55 controlled by an operating lever 56. The door 55 is normally retained in an open position by lever 56 engaging quadrant 60 so that material may be discharged from port 22 into the hopper 51. When it is desired to open the door 54 to remove ashes which have collected in the hopper, the door 55 is closed to prevent the escape of gases from the passage 6 through the discharge port 22 during the operation. An additional door 57 may be provided to permit access to the upper portion of the hopper in case cleaning or repairs become necessary. The floor of the hopper 51 may be provided with an insulating lining 58 of firebrick or the like to prevent erosion by the action of hot materials deposited thereon. Instead of a dry type of hopper a water seal type, such as is well known in the art, may be employed.

In operating the generator in a carburetted water gas set, fuel is supplied through charging hole 3 until a fuel bed of suitable height is built up. This fuel bed is then blasted by the introduction of air through air blast pipe 42 until the fuel bed has reached a condition of incandescence and the resultant blast gases burned in the carburetor and superheater have brought the checker brick in these chambers to the proper temperature for the succeeding gas making cycles. During the blasting cycle, as well as during the succeeding water gas making cycles, the grate is slowly rotated by means of drive shaft 47 carrying pinion 11 meshing with ring gear 10 which through flange 45 rotates the ash pan 9 and the impeller arms fixed thereon. Formation of side wall clinker is retarded and prevented by the water jacket 4. Any clinker formed in the bottom portion of the fuel bed is forced by the plows 12 upwardly and is crushed between the plows 12 and 21 and also by the crushing action exerted between the plows 12 and the armored plate 18.

The air introduced into the gas chamber 16 contacts and passes over flanges 23 and plates 26, into and through openings 19, through the hollow arms 12 and apertures 15, into and through the fuel bed thereabove. Hence, the air serves to cool the entire grate structure and at the same time is pre-heated by contact with the grate. The air in passing through the apertures 15 during the rotation of the ash pan is uniformly distributed along the under surface of the fuel bed. Due to the rotation of the grate, the incoming air continuously contacts with different portions of the base of fuel bed, and consequently, the tendency to channel is material lessened as compared with former water gas operation in which the blasting air was introduced through a central distributor.

At the completion of the blasting cycle, an uprun or backrun cycle may be commenced. If an uprun cycle is started, steam is admitted through pipe 43, passing through chamber 16, over plates 26, flanges 23, through openings 19, into the hollow plows, and through the apertures therein into the fuel bed. In order to purge passage 8 of blast gases, steam may be introduced through pipe 52 and passed through the passage 8 and passageways 6 through the fuel bed. The steam passing over the grate in intimate contact therewith, as in the case of the air during the blasting cycle, cools the grate and is effectively distributed throughout the fuel bed. Ash and clinker are continuously discharged through discharge port 22, the clinker and ash being expelled from the central portion of the fuel bed to the exterior by the action of the impelled arms 12, large clinker masses being crushed by the plows 12 and 21 and between plows 12 and armored plate 18. The water gas resulting from the reaction of the steam with the fuel bed leaves the generator through the offtake 2, passing into and through the carburetor and superheater in accordance with well known carburetted water gas practice.

During the backrun cycle, steam may be admitted either into the carburetor or superheater (not shown) or at the top of the generator through steam pipe 53. The steam introduced into the generator from the carburetor or superheater through port 2 or by means of steam pipe 53, passing down through the fuel bed, reacts therewith to form water gas, which is withdrawn through the passageways 6, annular passage 8, and the backrun gas offtake 7. The backrun gas, it will be noted, passes in intimate contact with the exterior surface of the water jacket and hence gives up a substantial proportion of its sensible heat content to the water therein. Water jacket 4 communicates with a steam drum, not shown, the steam formed therein preferably being utilized for the production of water gas by passage through the set during the uprun and downrun gas making cycles hereinabove described.

Since certain changes may be made in the above construction and different embodiments of the invention could be made without departing from the scope thereof, it is intended that all matter contained in the above description or shown in the accompanying drawings shall be interpreted as illustrative and not in a limiting sense. For example, while it is preferred to have the annular passage 8 extend substantially the full length of the water jacket 4 and to have the offtake 7 lead from the top of the water jacket, annular channel 8 may be eliminated and the downrun gas taken off directly from passageway 6 or the channel 8 may be made of much shorter extent so that it is disposed along only a minor portion of the outer wall of the water jacket, and the downrun gas withdrawn through an offtake disposed at the top of such shortened annular passage.

I claim:

1. A water gas generator having a fuel chamber, an annular boiler, the inner wall of said boiler constituting an inner wall of said fuel chamber, an additional wall surrounding said boiler and spaced therefrom providing an annular passage exteriorly of the outer boiler wall, in contact therewith, and communicating with said fuel chamber by a passageway, a rotatable ash pan for supporting a bed of fuel in said fuel chamber, said passageway being located at substantially the same horizontal level as said ash pan, a laterally extending impelling arm fixed to the upper surface of said ash pan, said arm having perforations therein in communication with openings in said ash pan, means for passing uprun steam through said openings in said ash pan, into and through the apertures in said arm into the fuel bed, means for passing downrun steam through said fuel bed and means for passing downrun water gas through said annular passage, and withdrawing the downrun water gas from said annular passage.

2. In a water gas generator, a fuel chamber, an annular boiler the inner wall of said boiler constituting a wall of said fuel chamber, an additional wall surrounding said boiler and spaced therefrom providing an annular passage exteriorly of the outer boiler wall and in contact therewith, a rotatable ash pan in said fuel chamber, said boiler being spaced from said ash pan so as to form a gas passage beneath said boiler from said fuel chamber to said annular passage, said gas passage being located at substantially the same horizontal level as said ash pan and substantially at the bottom of the fuel bed, and laterally extending impelling arms rigidly fixed to the upper surface of said ash pan, each of said arms having a longitudinal cavity in the face abutting said ash pan, the leading side of each of said arms being inclined downwardly toward the direction of rotation, the trailing side being substantially vertical and having a series of perforations therein, said ash pan having an aperture in registry with each of said cavities.

3. In a water gas generator, a fuel chamber, an annular boiler the inner wall of said boiler constituting the wall of said fuel chamber, an additional wall surrounding said boiler and spaced therefrom providing an annular passage exteriorly of the outer boiler wall and in contact therewith, said annular passage communicating with said fuel bed, a port near the top of said annular passage for removing gases therefrom, a rotatable ash pan in said fuel chamber, plows fixed to the upper surface of said ash pan, the leading side of each of said plows being inclined downwardly toward the direction of rotation, the trailing side being substantially vertical and having apertures therein, a gas chamber providing an inclined ash receiving member positioned beneath said ash pan, a plurality of downwardly extending flanges fixed to the bottom of said ash pan, projecting into said chamber and cooperating with said inclined ash receiving member to remove ashes accumulating thereon, said ash pan having openings communicating with the apertures in said plows, and means for passing steam and air through said openings in said ash pan into and through the apertures in said plows into the fuel bed.

4. A water gas generator adapted to contain a bed of fuel having the interior upper portion thereof lined with refractory material and having the side walls below the refractory lining constituted of a metal water jacket, an ash pan for supporting the fuel bed in said generator, plows fixed to the upper surface of said ash pan and having apertures therein, the upper surface of said plows being disposed above the base of the water jacket, said ash pan having an opening therein in communication with the apertures of said plows, means for supplying air and steam to said generator beneath the ash pan and passing the air and steam through the opening in said ash pan and the apertures of said plows into the fuel bed, and a downrun gas offtake at the base of the generator disposed substantially at the level of the ash pan and arranged to conduct the down-run gas passing through said offtake in heat exchange relationship with the base of said water jacket, said down-run gas during its passage through the generator traversing substantially the entire height of said fuel bed.

5. In a water gas generator, a fuel chamber, an annular boiler, the inner wall of said boiler constituting the wall of said fuel chamber, an additional wall surrounding said boiler and spaced therefrom, thereby providing an annular passage exteriorly of the outer boiler wall and in contact therewith, said annular passage communicating with said fuel bed, a port for removing gases from said annular passage, a rotatable ash pan in said fuel chamber, arms rotatably fixed to the upper surface of said ash pan and having apertures therein, a gas chamber defined in part by an ash receiving plate positioned beneath said ash pan, and a plurality of downwardly extending flanges on the bottom of said ash pan, said flanges extending into said gas chamber and cooperating with said ash receiving plate to remove ashes therefrom upon rotation of said ash pan.

6. A gas generator adapted to contain a bed of fuel, a rotatable ash pan for supporting said bed of fuel in said generator, the inner wall of said generator comprising an annular boiler, said inner wall providing an annular passage between said ash pan and said boiler for the discharge of gas from said generator and an opening for the discharge of ash, an ash receptacle associated with said opening, a plow affixed to the upper surface of said ash pan and arranged to agitate the fuel bed and an ash removing member fixed to said generator and having one portion extending into said fuel bed above said ash pan and cooperating with said plow to crush clinker, said member having another portion extending through said annular passage and into said opening to remove crushed clinker and ash through said opening into said receptacle.

CHARLES H. HUGHES.